United States Patent
Kretschmann et al.

(10) Patent No.: US 8,783,885 B2
(45) Date of Patent: Jul. 22, 2014

(54) OPERATING LIGHT AND A PROCESS FOR LIGHTING AN OPERATING TABLE BY MEANS OF AN OPERATING LIGHT

(75) Inventors: Hanno Kretschmann, Hamburg (DE); Christian Elsenbach, Bargteheide (DE); Patrick Wegner, Lübeck (DE)

(73) Assignee: Dräger Medical GmbH, Lübeck (DE)

( * ) Notice: Subject to any disclaimer, the term of this patent is extended or adjusted under 35 U.S.C. 154(b) by 346 days.

(21) Appl. No.: 13/183,801

(22) Filed: Jul. 15, 2011

(65) Prior Publication Data
US 2012/0106145 A1    May 3, 2012

(30) Foreign Application Priority Data
Nov. 3, 2010    (DE) .......................... 10 2010 050 300

(51) Int. Cl.
A61G 13/00    (2006.01)
F21V 13/00    (2006.01)

(52) U.S. Cl.
USPC ............................................. 362/33; 362/804

(58) Field of Classification Search
USPC ........... 362/228, 230, 293, 244, 245, 33, 231, 362/804, 226
See application file for complete search history.

(56) References Cited

U.S. PATENT DOCUMENTS

| | | | |
|---|---|---|---|
| 6,964,490 B2 * | 11/2005 | Scholz | 362/33 |
| 7,354,172 B2 | 4/2008 | Chemel et al. | |
| 7,841,731 B2 * | 11/2010 | Marka et al. | 362/85 |
| 8,662,719 B2 * | 3/2014 | Rohwedder et al. | 362/399 |
| 2004/0264193 A1 | 12/2004 | Okumura | |
| 2006/0098077 A1 | 5/2006 | Dowling | |

FOREIGN PATENT DOCUMENTS

| | | |
|---|---|---|
| CN | 101 65 8071 A | 2/2010 |
| EP | 1568934 A1 | 8/2005 |
| EP | 1568936 A1 | 8/2005 |
| EP | 1985912 A1 | 10/2008 |
| WO | 2003019072 A1 | 3/2003 |
| WO | 2007014769 A1 | 2/2007 |

OTHER PUBLICATIONS

International Standard IEC 60601-2-41 entitled "Medical Electrical Equipment—Part 2-41: Particular requirements for the basic safety and essential performance of surgical luminaires and luminaires for diagnosis", date: 2009.

* cited by examiner

*Primary Examiner* — Nimeshkumar Patel
*Assistant Examiner* — Glenn Zimmerman
(74) *Attorney, Agent, or Firm* — McGlew and Tuttle, P.C.

(57) ABSTRACT

An operating light (36) and a process are provided for lighting an operating table via an operating light (36). The operating light (36) includes at least one first radiation source (1), which is suitable for producing light (12) with locally different, especially radially outwardly decreasing color temperature distribution (18) in a plane extending at right angles to the work area.

20 Claims, 8 Drawing Sheets

OPERATING LIGHT AND A PROCESS FOR LIGHTING AN OPERATING TABLE BY MEANS OF AN OPERATING LIGHT

CROSS REFERENCE TO RELATED APPLICATIONS

This application claims the benefit of priority under 35 U.S.C. §119 of German Patent Application DE 10 2010 050 300.2 filed Nov. 3, 2010, the entire contents of which are incorporated herein by reference.

FIELD OF THE INVENTION

The present invention pertains to an operating light and to a process for lighting an operating table by means of an operating light.

BACKGROUND OF THE INVENTION

It is known that light-emitting diodes (LEDs) are used as a radiation-emitting component in many different fields of applications of novel light sources in order to benefit from the longer service life and better energy efficiency compared with conventional lighting means. Thus, examination or operating lights increasingly use LED technology, especially white LEDs. White LEDs may be composed of a blue-emitting semiconductor, which is coated with a phosphor layer, which absorbs part of the transmitting blue light, fluoresces broadband yellow light and thus generates white light by mixing the radiation.

In addition, some basic properties of operating lights, e.g., the color temperature or light color, which must be met by operating lights, are specified in International Standard IEC 60601-2-41 entitled "Medical Electrical Equipment—Part 2-41: Particular requirements for the basic safety and essential performance of surgical luminaires and luminaires for diagnosis".

Thus, a color temperature of 3,000 K-6,700 K is specified within a "color hexagon" close to the black body line for operating lights according to this standard specification. A light color temperature of about 4,500 K is established for operating lights (similar to direct sunlight).

The LED technology in operating lights makes it possible to directly set a color temperature (Correlated Color Temperature (CCT)) of the white light, e.g., by setting the properties of the phosphor material and setting the absorption length over the layer thickness of the phosphor material, for example, with monochromatic white LED with a color temperature of 4,500 K. As an alternative, this can likewise be achieved with different colored LEDs or different white LEDs. Light is mixed here to white at the site of the focus. An adjustable color temperature is likewise possible in operating lights of the LED configuration mentioned in the alternative, and this is set mostly according to personal preference.

An operating light with a plurality of LED lighting means is known from EP 1568936 A1, wherein some LEDs are designed to produce colored light and other LEDs are designed to produce white light and means for setting the intensity of the colored LEDs are provided. Furthermore, a process for lighting an operating site with an operating light comprising white or colored LEDs is described, wherein the intensity of the colored LEDs is adjustable.

An operating light with a light body for receiving lighting means is described in EP 1568934 A1, wherein a light source in the center of the light body can be actuated independently from other lighting means.

WO 2003/019072 A1 shows a conventional white light-emitting diode, which is used to set a color temperature and a color rendering property. The white light-emitting diode sets the color temperature, and a monochromatic correcting light-emitting diode is used to change the color rendering by color mixing.

WO 2007/014769 A1 shows an operating light with at least one light source arranged in a light body and with an optical means. To direct the visible radiation of the light source in a main light emission direction onto a field of operation, the operating light has an auxiliary lighting means, which can be switched independently from the light source.

An operating light, which has an optical imaging system and at least one lighting element with at least two light sources, wherein the light sources emit emissions of different spectra, is known from EP 1985912 A1. The light sources are arranged close to the optical axis of the lighting element, so that the emissions are superimposed even before they reach a reflector.

It is known that light with a large blue component (white light with a higher color temperature above 4,000 K, also called cold white or neutral white) enhances the ability to concentrate and reduces fatigue. However, this light is often felt to be too glaring and cold. Light with a large red component (lower color temperature below 4,000 K, warm white) is, by contrast, helpful for relaxing and relieves stress.

SUMMARY OF THE INVENTION

The object of the present invention is therefore to provide an operating light or a process for lighting an operating table by means of a corresponding operating light, which operating light or process leads to a further improvement of light perception compared with the lighting means known from the state of the art.

According to the invention, an operating light is provided with at least one first radiation source, which radiation source is suitable for producing light with a locally different color temperature distribution in a plane extending at right angles to a work area in the work area. The local color temperature distribution in the plane extending at right angles to the work area has an especially radial, outwardly dropping pattern with a plurality of especially radial areas of nearly constant or continuously changing, especially slightly decreasing color temperature. In a first area, which covers the innermost part of the work area, the color temperature is nearly constant and has a mean value between 4,500 K and 6,700 K, preferably between 5,200 K and 6,000 K and especially 5,400 K. In a second area, which adjoins the first area, the color temperature decreases from the inside to the outside. In a third area, which adjoins the second area, the mean value of the color temperature is between 3,000 K and 4,000 K, preferably between 3,200 K and 3,900 K and especially 3,500 K.

According to another aspect of the invention, a process is provided for lighting an operating table by means of an operating light. The process comprises providing a radiation source and producing light with the radiation source. The light has a locally different color temperature distribution in a work area, in a plane extending at right angles to the work area, wherein the locally color temperature distribution has a radially outwardly dropping pattern with a plurality of radial areas of at least one of nearly constant, continuously changing and slightly decreasing color temperature. The plurality of radial areas include a first area which covers an innermost part of the work area having a color temperature that is nearly constant and has a mean value between 4,500 K and 6,700 K, a second area, which adjoins the first area, the second area having a color temperature that decreases from an inside of the second area to an outside of the second area and a third area, which adjoins the second area, the third area having a mean color temperature value between 3,000 K and 4,000 K.

The operating light with at least one first radiation source is suitable for producing light with a locally different color temperature distribution in a plane extending at right angles to a work area in the work area; wherein the local color temperature distribution in the plane extending at right angles to the work area has an especially radial, outwardly decreasing pattern with a plurality of especially radial areas of nearly constant or continuously varied color temperature;

in a first area, which covers the innermost part of the work area, the color temperature is nearly constant and decreases slightly and has a mean value between 4,500 K and 6,700 K and preferably between 5,200 K and 6,000 K, and especially equals 5,400 K;

in a second area, which adjoins the first area, the color temperature decreases from the inside to the outside; and in a third area, which adjoins the second area, the mean value of the color temperature is between 3,000 K and 4,000 K, preferably between 3,200 K and 3,700 K and especially equals 3,500 K.

The local color temperature distribution has, in a plane extending at right angles to the work area or to the beam axis, a radial pattern and forms a plurality of radial areas with nearly constant or continuously varied color temperature.

"Nearly constant" means, in connection with the present invention, that the color temperature may undergo a slight change in the first area, especially, e.g., a decrease in the color temperature from the center to the outer edge of the area by less than 10%, preferably less than 5%, more preferably less than 2% and especially less than 1% in the first area.

In preferred embodiments, the color temperature changes by 600 K or less in the first area. The mean value of the color temperature in the first area preferably equals 5,400 K.

The color temperature preferably decreases in the second area by 1,000 K or more. The color temperature changes by preferably 600 K or less in the third area. The mean value of the color temperature in the third area preferably equals 3,500 K.

The first area preferably covers the working position within the work area, and the lighting intensity within the first area is greater than outside the first area.

In one embodiment, the size of the first area is determined by a first external diameter, at which the lighting intensity has dropped to 80% to 20% of the maximum thereof and preferably to 65% to 35% of the maximum thereof or to 50% of the maximum thereof. The size of the second area is determined by a second external diameter, at which the lighting intensity has dropped to 15% to 5% of the maximum thereof and preferably to 10% of the maximum thereof.

The pattern of the lighting intensity of the light is selected in a section at right angles to the beam axis within the work area to be such that the ratio of the diameter at 50% of the intensity to the diameter at 10% of the intensity is at least 0.5, this ratio being independent from the pattern of the color temperature.

In an exemplary embodiment, the radiation source comprises an LED chip with a phosphor converter, which is applied in front of the chip in the emission direction and is larger than the chip, so that light with different color temperatures can be emitted locally and in a direction-dependent manner.

In a variant of this embodiment, the radiation source comprises an optical system for bundling and imaging the light radiation. The optical system is designed such that the local color temperature characteristic is preserved.

In another embodiment, the operating light comprises a plurality of different radiation sources, wherein homogeneous color temperatures of the radiation sources are superimposed to the local color temperature pattern by means of different focus diameters.

In another embodiment, the operating light comprises a plurality of radiation sources of the same type, wherein the radiation sources comprising a plurality of LED lens pairs with radial color temperature pattern are oriented toward a light spot at a defined working distance.

In another embodiment, the operating light comprises a plurality of radiation sources with different lighting means. The different lighting means comprise halogen lights, gas discharge lights or LEDs.

In another embodiment, the radiation sources have a light filter and reflector of their own, which are arranged in a light body one after another and both produce a light spot each with different, homogeneous color temperatures and different focus diameters on a common axis at the same working distance. The reflector may also be split.

At least one first radiation source, which is suitable for producing light with a local color temperature distribution in a work area in a plane extending at right angles to the beam axis or to the axis of the light, is made available in the process according to the present invention for lighting an operating table by means of an operating light.

In one embodiment of the process, a light spot with a radial color temperature pattern is produced, which has a constant color temperature pattern in a first area, and has a color temperature decreasing towards the edge of the light spot, wherein the color temperature pattern is preset such that more fatigue-free working is made possible during the operation of the operating light, and a physiological light perception is utilized by the central operating site being lit with higher color temperature in order to make possible high concentration and less fatigue, and a lower color temperature is provided at the edge or outside the central operating site in order to create a quieter picture with less overstimulation.

The present invention is explained in more detail below on the basis of exemplary embodiments with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 12b is a schematic cross-sectional view showing another operating light according to the present invention at a right angle with respect to the cross-section of FIG. 12a;

DESCRIPTION OF THE PREFERRED EMBODIMENTS

Figure 1:
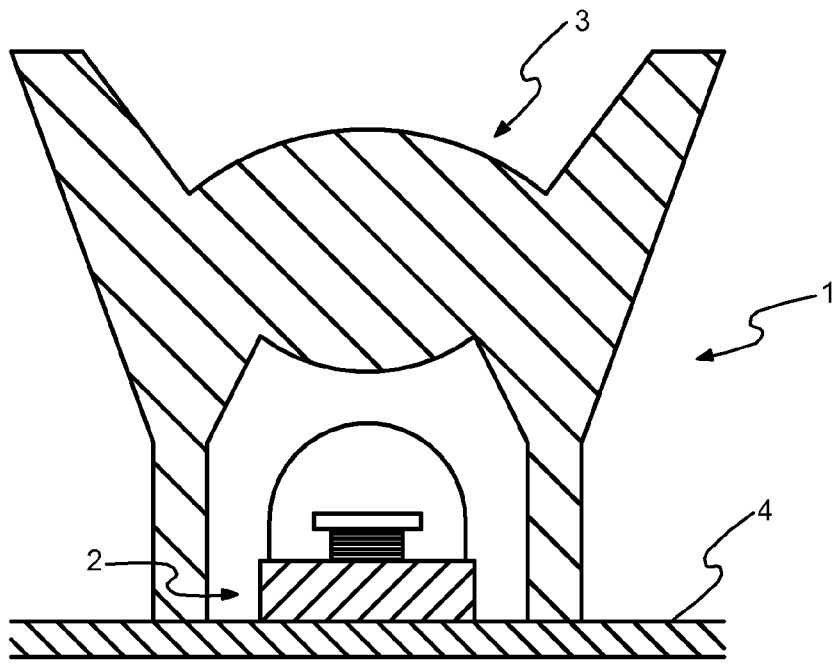
FIG. 1 is a cross-sectional view showing a radiation source with an optical system as components of an operating light according to the present invention.

Referring to the drawings in particular, FIG. 1 shows a radiation source with an optical system as a component of an operating light according to the present invention in a cross-sectional view, as it is used, for example, in operating rooms of hospitals. The radiation source 1 comprises an LED 2 and the optical system 3, wherein the optical system 3 is arranged on a radiation-emitting side of LED 2. The orientation of LED 2 to optical system 3 can be achieved by fastening on a printed circuit board 4 by means of a base 8, for example, by soldering. The printed circuit board 4 also guarantees the power supply of LED 2 via contact tabs 9.

Figure 2:
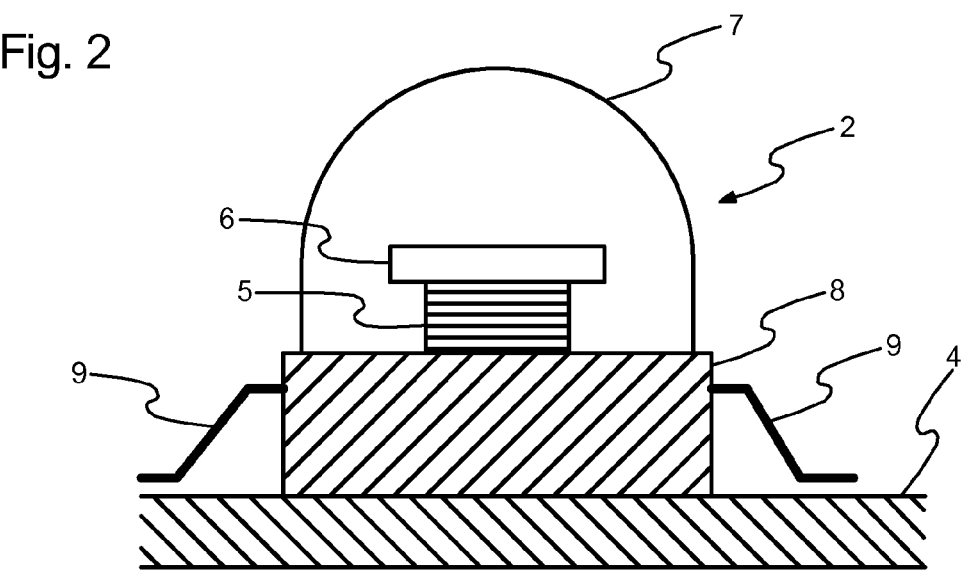
FIG. 2 is a cross-sectional view showing the radiation source from FIG. 1.

As is shown in FIG. 2, light source 1 comprises LED 2 emitting white light with a blue-emitting chip 5. A phosphor converting into "yellow" light, which is designed as a phosphor layer 6 here, is applied on the radiation-emitting side of LED 2. Furthermore, a primary lens 7 is provided, which increases the uncoupling efficiency. The area of phosphor layer 6 is larger in the embodiment according to FIG. 2 than that of chip 5. For example, an area of approximately 1 mm² may be selected for chip 5 of LED 2 and the area of the phosphor layer 6 may equal 2 mm² in this example. The LED 2 used is, for example, the neutral white light-emitting diode P4, which is manufactured by Seoul Semiconductor.

The blue light emitted by chip 5 of LED 2 radiates through the phosphor layer 6. "Yellow" light, which mixes with blue light into white, fluoresces in phosphor layer 6. The path length of the blue light through phosphor layer 6 is longer at the edge of phosphor layer 6, so that more blue light is converted into "yellow" light. Consequently, the blue/yellow light mixing ratio is shifted compared to the center, and a white light with a varied color temperature, i.e., with a lower color temperature in this case, is formed.

The phosphor layer 6 is coordinated here such that the color rendering is very high in all color ranges, which is characterized by a color rending index (CRI) higher than 85.

Figure 3:
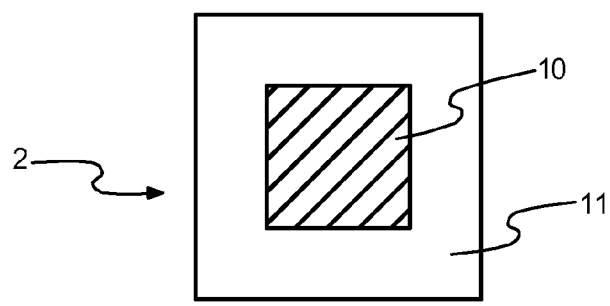
FIG. 3 is a schematic top view showing an intensity profile of the radiation source from FIG. 1.

As a result, a combined light emitter is formed from the chip plus the phosphor layer located in front of it with a quasi-rectangular radial color temperature profile, which is schematically shown in FIG. 3. Light with a color temperature of approximately 5,300 K is emitted in the inner area 10. The color temperature equals 3,600 K in the outer area 11.

Such a light source is not usually desired for lighting applications, because a homogeneous color temperature distribution is necessary for many such applications. However, it is advantageous in this case, especially if the emitted light is imaged through the optical system 3 while maintaining the local color temperature distribution, as is explained below.

Figure 4:
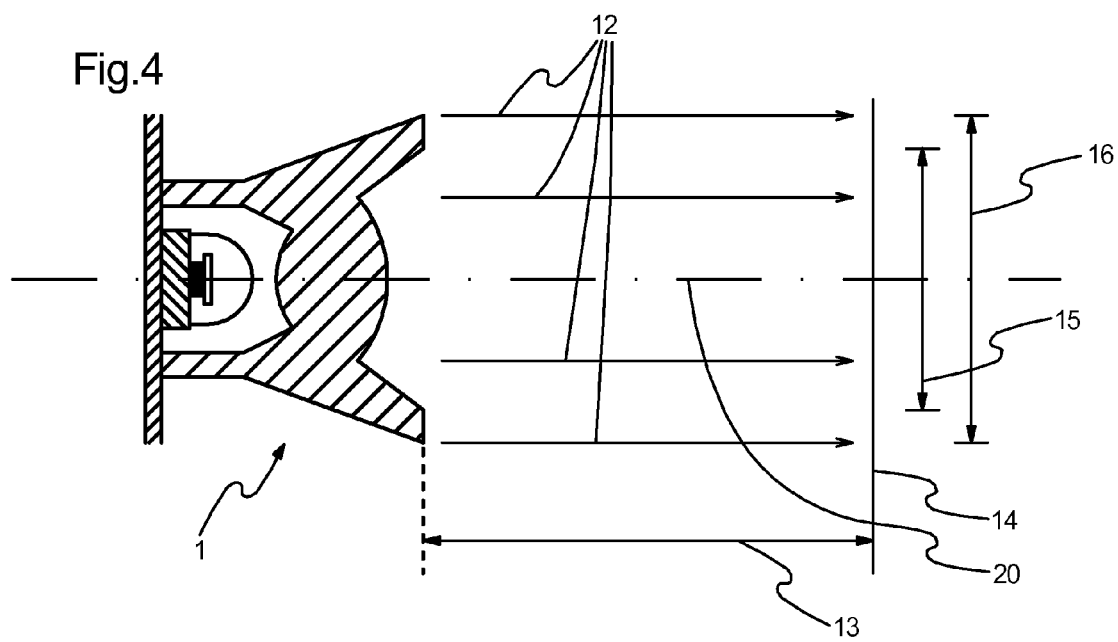
FIG. 4 is a sectional view showing an operating light according to the present invention according to FIGS. 1 through 3.

The light source 1 produces light emission 12, which produces, at a working distance 13 of about 1 m, centered around a light source axis 20, on a working surface 14, a light spot 24 with a first diameter 16 of about 20 cm (typically 10 cm to 40 cm) and with a second diameter 15 of about 10 cm (typically 5 cm to 20 cm), as it is shown in FIG. 4. The first diameter 16 is characterized by a drop in intensity to about 10% of the central light intensity. The second diameter 15 is characterized by a drop in intensity to about 50% of the central light intensity. The intensity pattern of the light spot 24 on the working surface 14 is schematically shown in the diagram in FIG. 5a.

Figure 5:
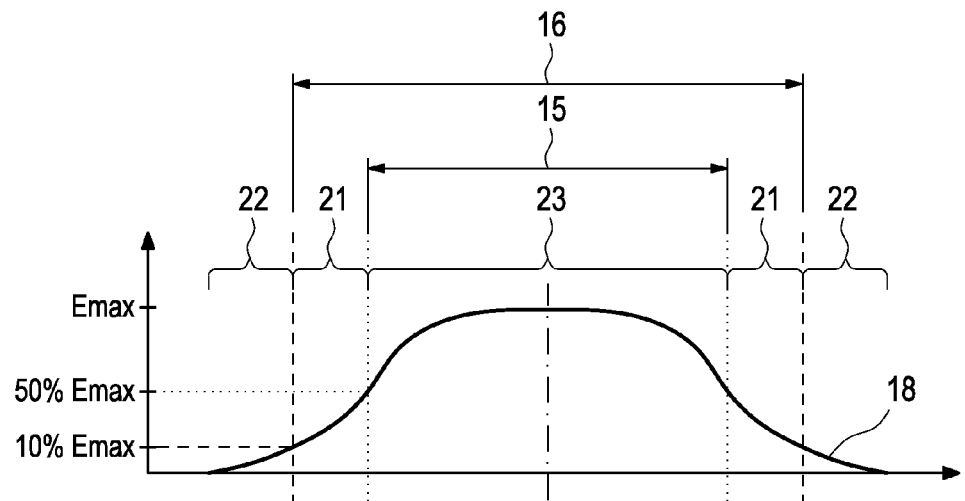
FIG. 5a is a diagram concerning the radiation characteristic of the operating light according to FIG. 4.
FIG. 5b is another diagram concerning the radiation characteristic of the operating light according to FIG. 4.
FIG. 5c is another diagram concerning the radiation characteristic of the operating light according to FIG. 4.
Figure 5:
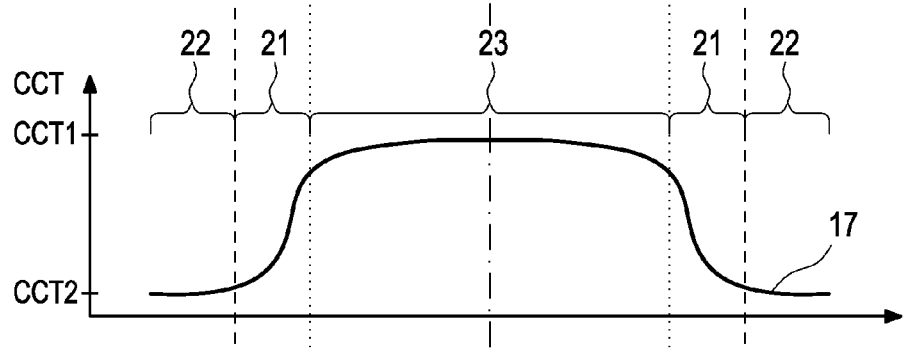
Figure 5:
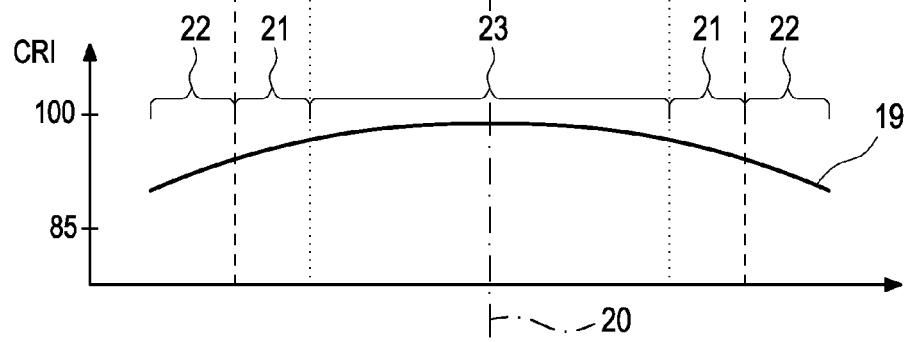
Figure 6:
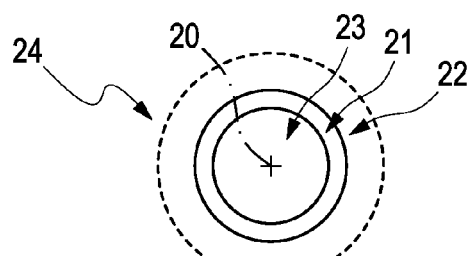
FIG. 6 is a schematic view showing an intensity profile of the operating light according to FIG. 4.

The light source 1 produces the light spot 24 with an outwardly decreasing color temperature, as it is shown in FIG. 5b and FIG. 6. Three color temperature areas 21, 22, 23 are formed now. The first area 23 is located in the center of the light spot 24 and has a diameter of about 10 cm and has a high color temperature CCT1 with a mean value of 5,400 K in the center; the decrease in color temperature in this area is small and does not exceed 70 K in this diagram (FIG. 5b). In a second, middle area 21, the color temperature decreases by more than 1,000 K, for example, to a diameter of 20 cm. There is a nearly constant, but nevertheless slightly decreasing color temperature CCT2 of at least 3,600 K in a third, outer area 22, which adjoins the second area 21 outside of 20 cm.

The intensity distribution of the light source is illustrated in FIG. 5a. In the first area 23, the lighting intensity is higher than 50% of the maximum lighting intensity in the center of the radiation and increases towards the center. The lighting intensity decreases greatly in the second area, which adjoins the first area, but it is still always more than 10% of the maximum lighting intensity, even towards the outer edge of the area. The lighting intensity decreases further to a value of zero in the outermost area 22.

The light source produces light that has a high color rendering (CRI>85), as is shown in FIG. 5c, over the entire areas 21, 22, 23, i.e., up to a diameter of about 25 cm.

Figure 7:
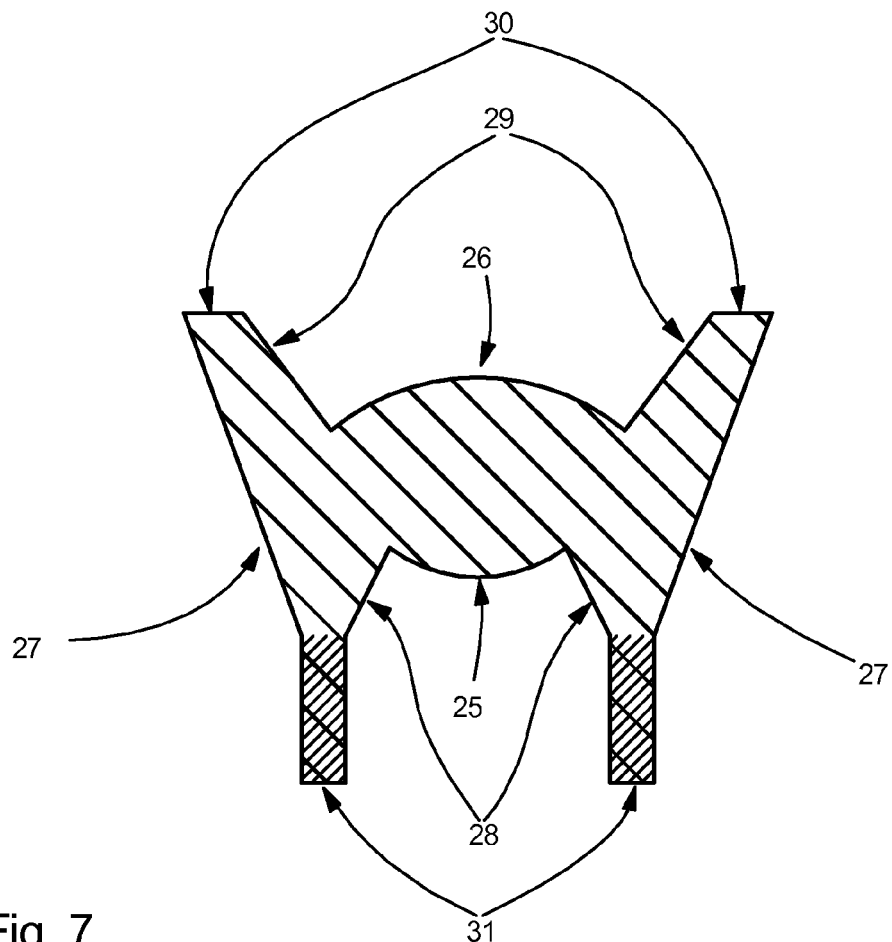
FIG. 7 is a cross-sectional view showing the optical system from FIG. 1.
Figure 8:
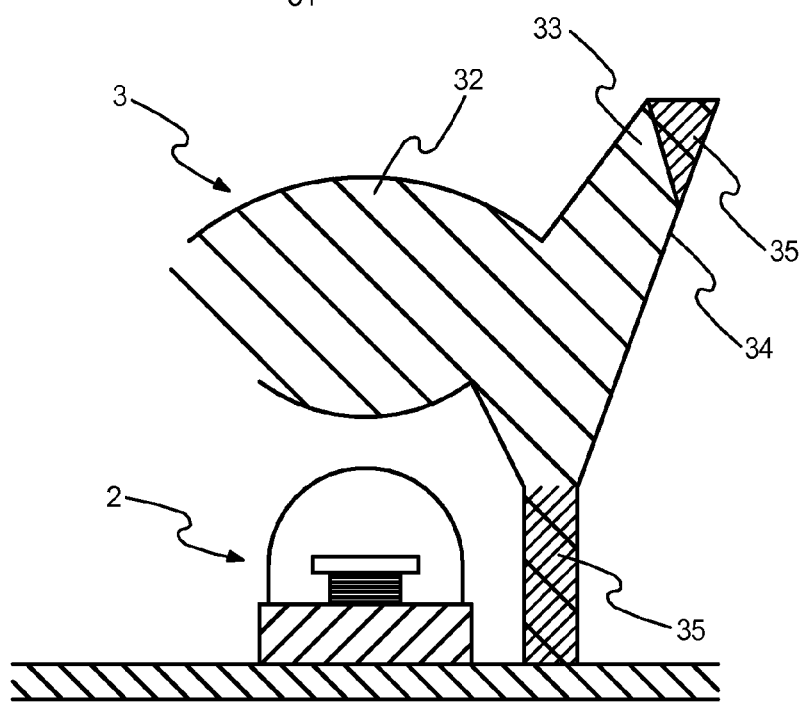
FIG. 8 is a cross-sectional view showing another radiation source with optical system as components of an operating light according to the present invention.

Optical system 3 of light source 1 for LED 2 is shown in more detail in FIG. 7. Optical system 3 is a combination of refractive and reflecting optical elements. It is calculated numerically for the special requirement imposed on an operating light and the desired light distribution and is manufactured according to the injection molding process, for example, from plastic such as polymethyl methacrylate (PMMA). Reflection is used in the outer area 33 of optical system 3 in the form of total internal reflection on a surface 34, and refraction is used in the inner area 32 on two surfaces to form a light beam. Optical system 3 has a reflective aspherical total internal reflection (TIR) surface 27. Moreover, optical system 3 has areas 35 for mechanical fixation, whose surfaces 30, 31 do not have any optical function.

According to the requirements imposed on operating lights, the light 12 of the light sources 1 has a light spot diameter 16 of about 20 cm (at 10% intensity) at a working distance 13 of about 1 m.

Efforts are usually made in designing the optical system to make do without imaging properties for optimizing the surfaces of an LED optical system for collimating the light emission of the LED in order to homogenize the color temperature patterns of LED 2 and to compensate or make invisible source details, e.g., bond wires, rectangular surfaces, inhomogeneous color temperature and brightness distribution. However, LEDs with homogeneous distribution of intensity and/or color temperature are usually used to optimally compensate inequalities to the extent possible.

Difference in the invention being described: Instead of using an LED with the greatest possible homogeneity of intensity and color temperature pattern, an optical system is selected here which comprises collimation with imaging properties of the light source 1 at the working distance 13 in order to obtain a locally resolved radiation characteristic of the LED. An LED 2 with the most inhomogeneous color distribution possible supports the design. The geometric details of the source (bond wires, rectangular shape) are effaced and become invisible due to superimpositions of the lights of many light sources with different directions. However, the fact that the many sources are placed one over the other does not cause any change in the color temperature and brightness distribution (FIGS. 5a, 5b, 5c and FIG. 6) of an individual source.

Furthermore, optical system 3 is constructed such that the lighting intensity profile at the working site drops to 50% of the central lighting intensity at the diameter of about 10 cm. At the same time, optical system 3 ensures that an intensity profile meeting the guidelines for an operating light (EN 60601-2-41), i.e., the ratio of the diameter at 50% of the intensity to the diameter at 10% of the intensity equals >0.5, this ratio being independent from the changes in color temperature, is generated at the imaging site.

Figure 9:
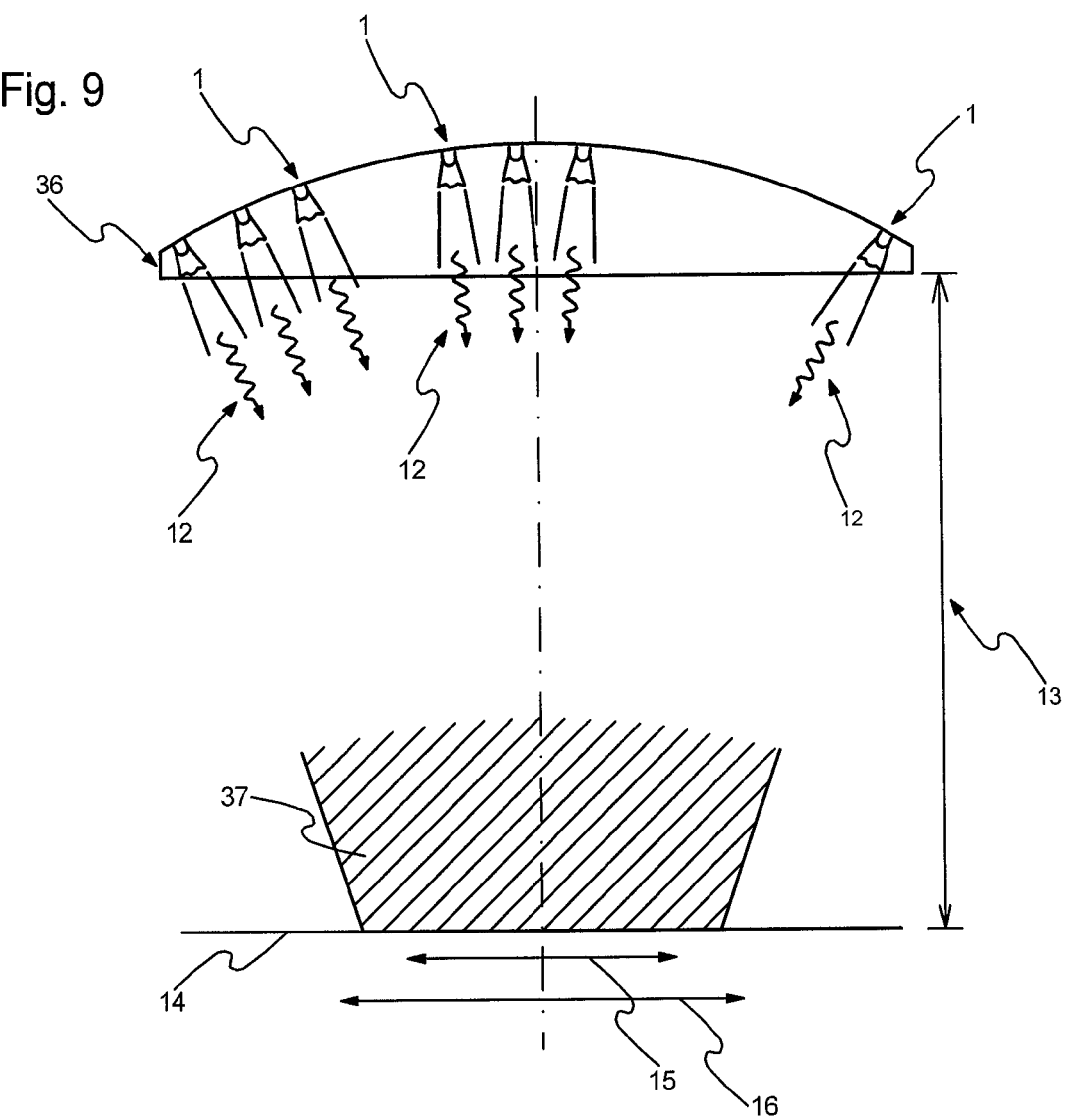
FIG. 9 is a cross-sectional view showing another operating light according to the present invention.

To obtain the desired lighting intensity of an operating light, a plurality of radiation sources with LED 2 and optical system 3 are typically used as a light source, as it is shown in FIG. 9. Many of the color-optimized light sources 1 with LED 2 and optical system 3 are used here, and their light 12 is imaged as a superimposed light radiation 37 to a light spot 24, which does, however, again have the desired color temperature and intensity profile, as is described in Figures FIGS. 5a, 5b, 5c and 6. The transition 21 between the two areas of nearly constant color temperature 22, 23 becomes somewhat less sharp than in case of an LED/optical system light source only due to manufacturing tolerances.

For example, an embodiment of operating light 36, which is equipped with 66 light sources 1 comprising LED 2 and optical system 3, is shown in FIG. 9. The light sources 1 are oriented such that the superimposed light 37 from each LED/optical system of light source 1 is superimposed on the axis 20' of the combined light sources at the working distance 13 of the operating light 36.

Figure 10:
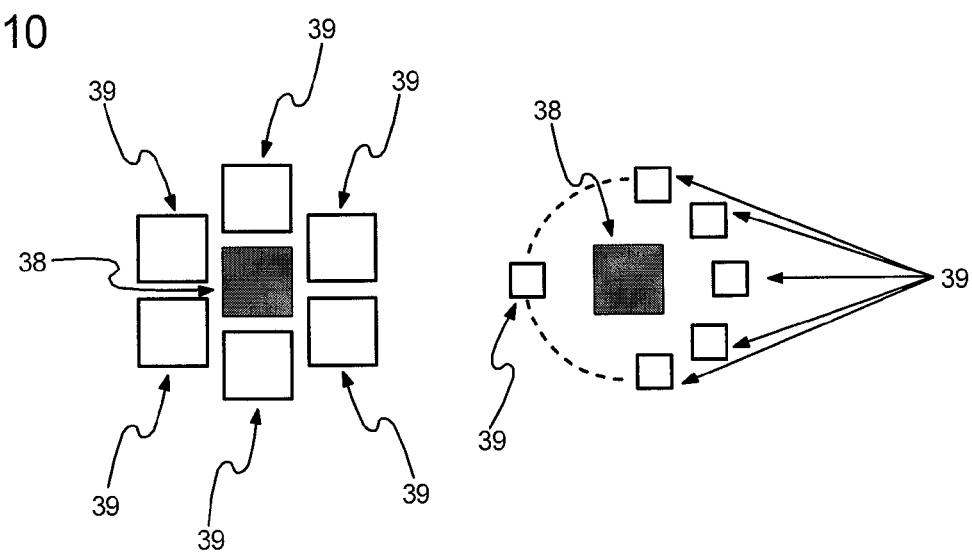
FIG. 10 is a schematic view showing an arrangement of light sources for producing a suitable CCT radiation distribution.

It is also possible to use only one LED with a suitable optical system in case of LEDs with a very high light intensity (e.g., >1,000 μm). It is likewise possible to use, instead of an LED 2 with a small chip 5 and a larger phosphor layer 6, an array of a plurality of LED chips 39 with low color temperature and selected intensities around a central LED 38 with a high color temperature, as it is shown in FIG. 10. Accordingly, a color temperature distribution 18, a lighting intensity pattern 17 and a color rendering pattern 19 are produced in the light spot 24, which corresponds to those according to FIGS. 5a, 5b, 5c and FIG. 6.

Figure 11:
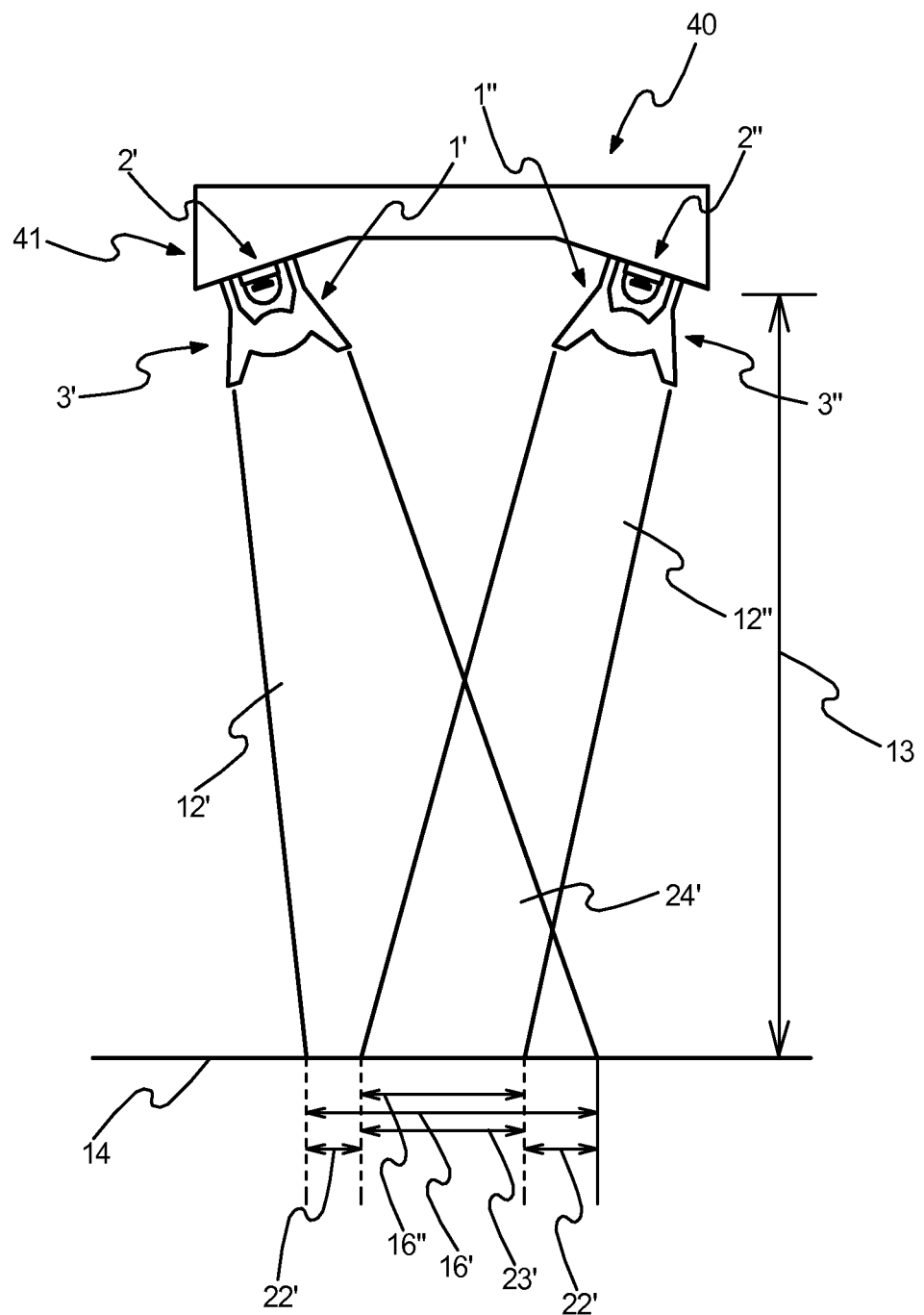
FIG. 11 is a cross-sectional view showing another operating light according to the present invention.

FIG. 11 shows as another exemplary embodiment an array of a combined light source 40 with two light sources 1' and 1", which comprise two LEDs 2' and 2" each and two optical systems 3' and 3" each. As an alternative, one of the two light sources 1' or 1" may also have another lighting means and/or optical system.

It is likewise possible to use two light sources 1' and 1", which are oriented in relation to one another on a mechanical fixing means 41, multiply with different color temperatures and different light spot diameters 16' and 16" of, e.g., 15 cm and 25 cm, respectively. The light radiation of the light sources 1' and 1" is superimposed at the working distance 13 in order to produce a light spot 24'.

Consequently, a color temperature area 23', which is formed from the mixture of light radiations 12' and 12" of the two light sources 1' and 1" with high color temperature, is obtained centrally. In the edge area, i.e., at a diameter of, e.g., 15 cm to 20 cm or greater, a color temperature area 22' with a low color temperature is formed, which results only from the light source 1' with the larger light spot diameter 16'.

The two light sources 1' and 1" or a multiple array of the two light sources 1' and 1" may be located in one light body, arranged next to each other or one after another with a separate or split optical system. It is also possible to use separate light bodies, which are oriented such that their axes 20' intersect at the working distance 13 in order to produce a common light spot 24'.

Figure 12A:
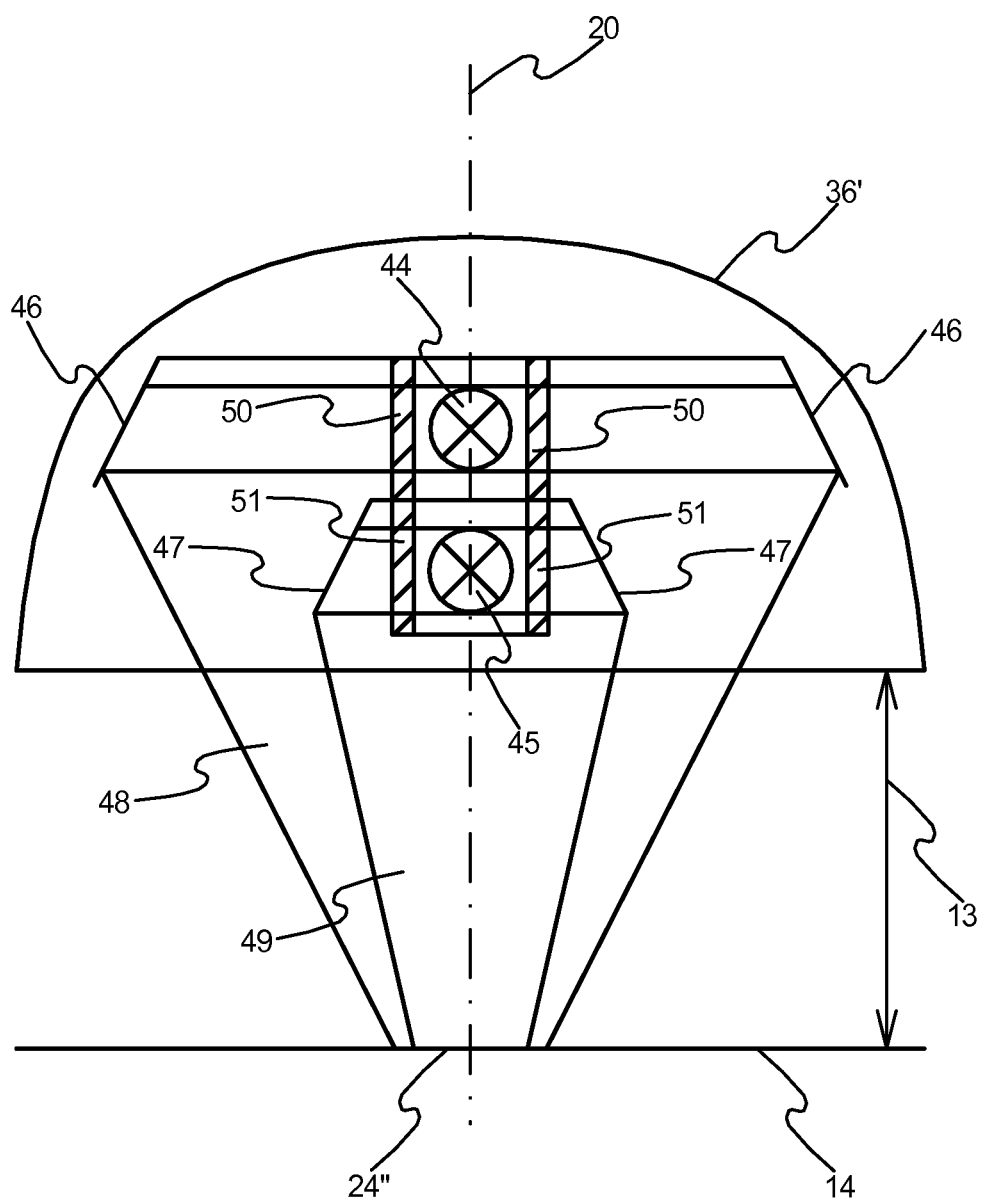
FIG. 12a is a schematic cross-sectional view showing another operating light according to the present invention.
Figure 12B:
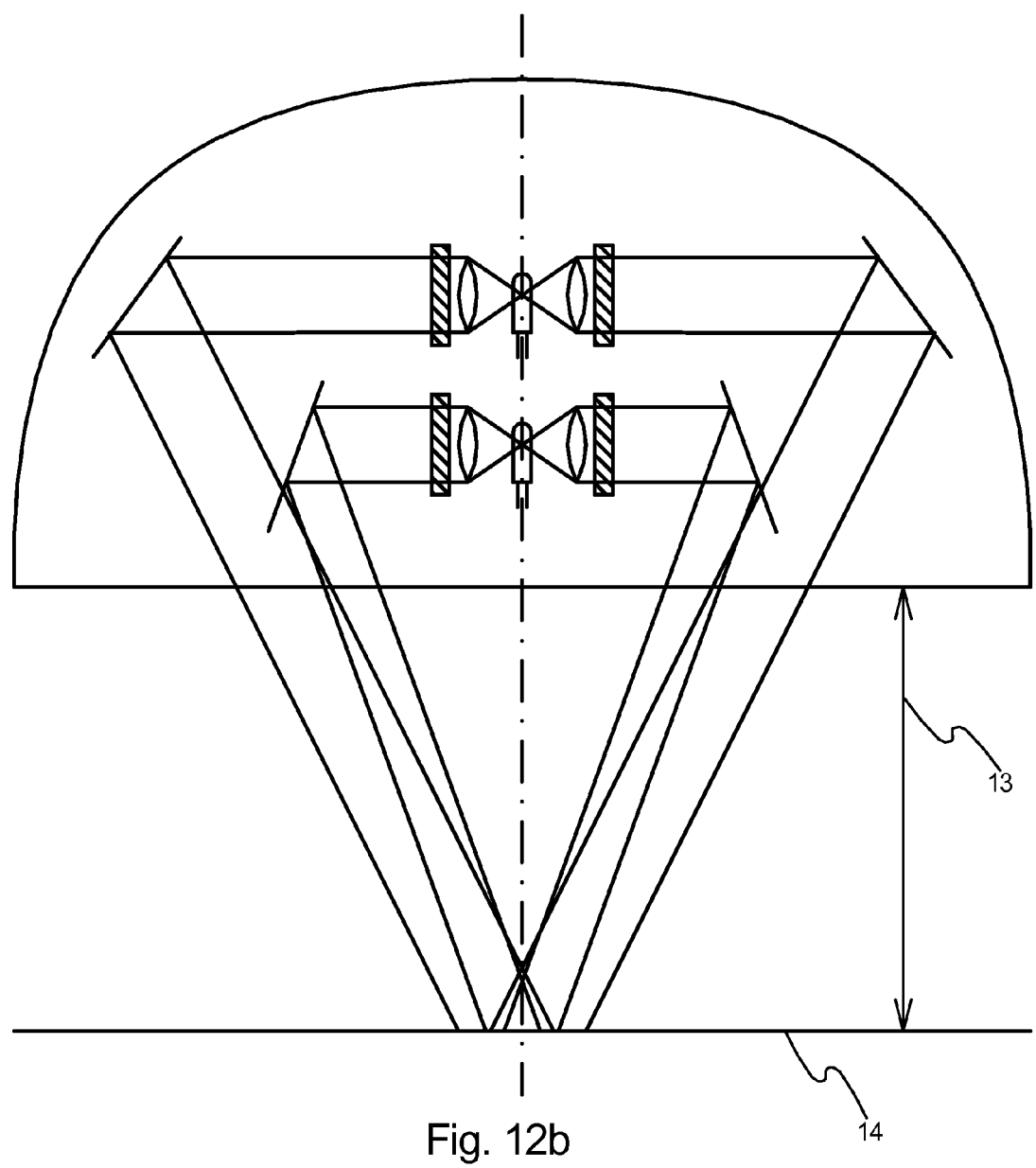
Figure 13:
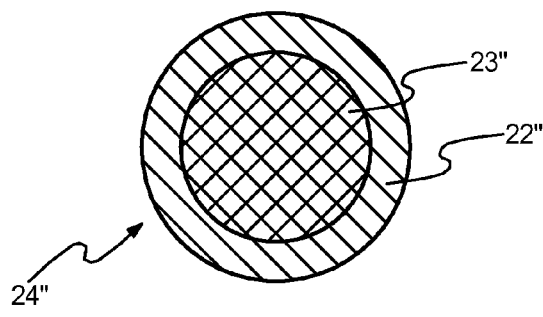
FIG. 13 is a schematic intensity profile of the operating light according to FIGS. 12a and 12b.

FIGS. 12a and 12b show a special arrangement of the combined light source 40 for an operating light 36' in two cross-sectional views, which are at right angles to each other. A first light source 44 with a low color temperature and a second light source 45 with a high color temperature are arranged in this exemplary embodiment one after another on the beam axis 20 of the operating light. It is obvious that the sequence shown could be reversed as well. The light sources may be, e.g., LEDs, halogen lights, gas discharge lights or other lights known to the person skilled in the art. The light 48 and 49 of the light sources 44 and 45 is superimposed via additional reflectors 46 and 47 at the working distance 13 on a working surface 14 into a light spot 24". This light spot 24" comprises an area 23", in which the light of both light sources is superimposed, and which has a high color temperature, and an area 22", in which essentially only light from light source 44 with a lower color temperature arrives, as is also shown in FIG. 13. The color temperature of the light of the light sources may be set by means of transparent color filters 50 and 51 such that a desired color temperature and color distribution are obtained in the light spot 24".

In summary, a light spot with a radial color temperature pattern is produced, which has a relatively constant color temperature pattern in a first area and has, adjoining same, a color temperature decreasing towards the edge of the light spot, and the color temperature pattern can be selected to be such that fatigue-free working is made possible during the operation of the operating light. A physiological light perception is thus utilized during the operation by lighting an operating site with a higher color temperature in order to make high concentration and reduced fatigue possible, and a lower color temperature is provided outside the operating site in order to create a quieter picture with a lower extent of so-called overstimulation.

While specific embodiments of the invention have been shown and described in detail to illustrate the application of the principles of the invention, it will be understood that the invention may be embodied otherwise without departing from such principles.

APPENDIX

| | |
|---|---|
| 1, 1', 1" | Radiation source |
| 2, 2', 2" | LED |
| 3, 3', 3" | Optical system |
| 4 | Printed circuit board |

APPENDIX-continued

| | |
|---|---|
| 5 | Chip |
| 6 | Phosphor layer |
| 7 | Primary lens |
| 8 | Base |
| 9 | Contact tab |
| 10 | Inner area |
| 11 | Outer area |
| 12, 12', 12" | Light radiation |
| 13 | Working distance |
| 14 | Working surface |
| 15 | Second diameter |
| 16, 16', 16" | First diameter |
| 17 | Lighting intensity pattern |
| 18 | Color temperature distribution |
| 19 | Color rendering pattern |
| 20, 20' | Light source axis |
| 21, 21' | Second area |
| 22, 22' | Third area |
| 23, 23' | First area |
| 24, 24', 24" | Light spot |
| 25, 26 | Refractive aspherical surfaces |
| 27 | Reflecting TIR surface |
| 28, 29 | Planar surfaces |
| 30, 31 | Surfaces |
| 32 | Refraction |
| 33 | Reflection |
| 34 | Surface |
| 35 | Area for mechanical fixation |
| 36, 36' | Operating light |
| 37 | Superimposed light radiation |
| 38 | Central LED |
| 39 | Multiple array of LED chips |
| 40 | Combined light source |
| 41 | Mechanical fixing means |
| 44 | First light source |
| 45 | Second light source |
| 46, 47 | Reflector |
| 48, 49 | Light beam |
| 50, 51 | Transparent color filter |

What is claimed is:

1. An operating light comprising:
a radiation source for producing light with a locally different color temperature distribution in a work area, in a plane parallel to a working surface, wherein said locally color temperature distribution has a radially outwardly dropping pattern with a plurality of radial areas of at least one of nearly constant, continuously changing and slightly decreasing color temperature, the plurality of radial areas comprising:
  a first area which covers an innermost part of the work area having a color temperature that is nearly constant and has a mean value between 4,500 K and 6,700 K;
  a second area, which adjoins the first area, the second area having a color temperature that decreases from an inside of the second area to an outside of the second area; and
  a third area, which adjoins the second area, said third area having a mean color temperature value between 3,000 K and 4,000 K.

2. An operating light in accordance with claim 1, wherein the color temperature in the first area changes by 600 K or less.

3. An operating light in accordance with claim 1, wherein the color temperature in the second area decreases from the inside of the second area to the outside of the second area by 1,000 K or more.

4. An operating light in accordance with claim 1, wherein the color temperature in the third area changes by 600 K or less.

5. An operating light in accordance with claim 1, wherein the first area covers a working position within the work area, wherein the lighting intensity is greater within the first area than outside the first area.

6. An operating light in accordance with claim 1, wherein a size of the first area is determined by a first area external diameter, at which the lighting intensity drops to 80% to 20% of a maximum first area lighting intensity.

7. An operating light in accordance with claim 1, wherein a size of the second area is determined by a second area external diameter, at which the lighting intensity has dropped to 15% to 5% of a maximum second area lighting intensity.

8. An operating light in accordance with claim 1, wherein:
  the radiation source comprises an LED chip with a phosphor converter applied in front of the LED chip in an emission direction; and
  said phosphor converter is larger than the LED chip in order to locally emit light with different color temperatures.

9. An operating light in accordance with claim 1, wherein the radiation source comprises an optical system for bundling and imaging a light emission, wherein said optical system is designed such that a local color temperature characteristic is preserved.

10. An operating light in accordance with claim 1, further comprising at least one additional radiation source to provide a plurality of different radiation sources, wherein homogeneous color temperatures of the radiation sources are superimposed by means of different focus diameters to the local color temperature pattern.

11. An operating light in accordance with claim 1, further comprising at least one additional radiation source to provide a plurality of radiation sources of a same type, wherein the radiation sources comprise a plurality of LED lens pairs with a radial color temperature pattern oriented towards a light spot at a defined working distance.

12. An operating light in accordance with claim 1, further comprising at least one additional radiation source to provide a plurality of radiation sources with a lighting means comprising one or more of halogen lights, gas discharge lights and LEDs.

13. An operating light in accordance with claim 1, further comprising at least one additional radiation source to provide a plurality of radiation sources, each of said radiation sources having a light filter and a reflector arranged one after another in a light body and each of said radiation sources produce a light spot with different, always homogeneous color temperature and different focus diameters at a same working distance on a common axis.

14. An operating light in accordance with claim 1, wherein:
  the first area has a color temperature mean value between 5,200 K and 6,000 K; and
  the third area has a mean color temperature value that is between 3,200 K and 3,900 K.

15. An operating light in accordance with claim 6, wherein the lighting intensity drops to 65% to 35% of the maximum at the first area external diameter.

16. A process for lighting an operating table, the process comprising the steps of:
  providing an operating light with a radiation source;
  producing light with the radiation source, the light having a locally different color temperature distribution in a work area, in a plane parallel to a working surface, wherein said locally color temperature distribution has a radially outwardly decreasing pattern with a plurality of radial areas of at least one of nearly constant, continuously changing and slightly decreasing color temperature, the plurality of radial areas comprising:
- a first area which covers an innermost part of the work area having a color temperature that is nearly constant and has a mean value between 4,500 K and 6,700 K;
- a second area, which adjoins the first area, the second area having a color temperature that decreases from an inside of the second area to an outside of the second area; and
- a third area, which adjoins the second area, said third area having a mean color temperature value between 3,000 K and 4,000 K.

17. A process in accordance with claim 16, further comprising:
- producing a light spot with a radial color temperature pattern which has a nearly constant color temperature pattern in said first area and, adjoining same, and has a color temperature decreasing towards the edge of the light spot; and
- setting the color temperature pattern such that fatigue-free working is made possible during the operation of the operating light.

18. A process in accordance with claim 16, further comprising:
- using physiological light perception during the operation by an operating site being lit with a higher color temperature in order to make high concentration and low fatigue possible, and a lower color temperature is provided outside the operating site in order to create a quieter picture with a lower extent of overstimulation.

19. An operating light for lighting a work area of a working surface of an operating table in an operating room, the operating light comprising:
- a radiation source producing light in the work area with a color temperature distribution that differs between local areas in a plane parallel to the working surface, the local areas of the color temperature distribution comprising:
  - a first area covering an innermost part of the work area and having a color temperature that is nearly constant with a mean value between 4,500 K and 6,700 K;
  - a second area adjacent to the first area and having a color temperature that decreases from an inside of the second area to an outside of the second area; and
  - a third area adjacent to the second area and having a mean color temperature value between 3,000 K and 4,000 K.

20. An operating light in accordance with claim 19, wherein:
- the color temperature in the first area changes by 600 K or less;
- the color temperature in the second area decreases from the inside of the second area to the outside of the second area by 1,000 K or more;
- the color temperature in the third area changes by 600 K or less.

* * * * *